(No Model.)

A. HOFMANN.
TWO WHEELED VEHICLE.

No. 331,705. Patented Dec. 1, 1885.

WITNESSES:
V. M. Hood.
A. M. Hood.

INVENTOR:
Adam Hofmann.
By H. P. Hood.
Atty.

UNITED STATES PATENT OFFICE.

ADAM HOFMANN, OF INDIANAPOLIS, INDIANA.

TWO-WHEELED VEHICLE.

SPECIFICATION forming part of Letters Patent No. 331,705, dated December 1, 1885.

Application filed May 25, 1885. Serial No. 166,593. (No model.)

*To all whom it may concern:*

Be it known that I, ADAM HOFMANN, a citizen of the United States, residing at Indianapolis, in the county of Marion and State of Indiana, have invented a new and useful Improvement in Two-Wheeled Vehicles, of which the following is a specification.

My invention relates to an improved manner of connecting the shafts to the body in a two-wheeled vehicle.

The object of my improvement is to prevent the vertical oscillating movement of the shafts from being communicated to the body of the vehicle, and also to maintain the equilibrium of the body solely by means of the shafts and the irons connecting the shafts with the body.

The accompanying drawings illustrate my invention.

Figure 2:
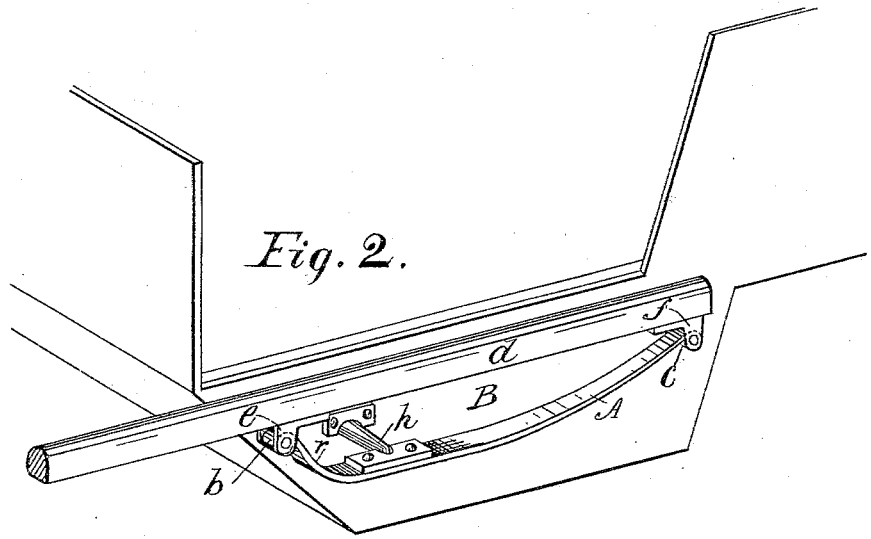
Figure 1:
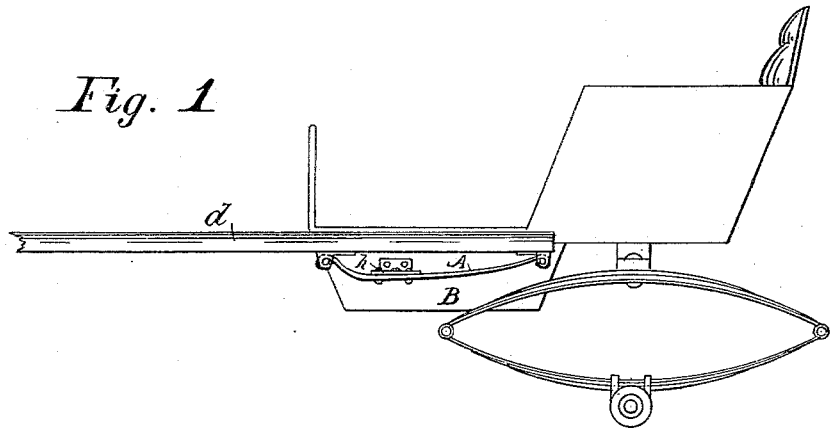

Figure 1 represents a side elevation; Fig. 2, an enlarged view, in perspective, of the shaft, shaft-spring, and bracket.

A is a flat spring bent with a short curve, $r$, at one end, and turned at each end to form eyes $b$ and $c$, which are both connected to the under side of the shaft $d$, at its rear end, by means of bolts passing through said eyes and through suitable brackets, $e$ and $f$, bolted or otherwise permanently secured to the shaft. Each shaft of the vehicle is provided with a spring, like A, and said springs are secured to the body B, near the front end thereof, one on each side, by means of brackets, like $h$. Said bracket is rigidly secured to one of the flat sides of the spring near the curve $r$, and also to the body B, at a point forward of the axle, and preferably near the front end. The body is mounted on a pair of elliptic springs resting on the axle in the usual manner. In operation the short upturned end of the spring forms a pivotal bearing on which the shaft oscillates with the movement of the horse; the front of the body resting on the springs, and being connected with the shafts only through the bracket $h$ and said springs, the oscillation of the shafts is not communicated to the body.

Heretofore in this class of vehicles, in which the shaft is pivoted directly to the body and the spring differently constructed and connected, it has been found necessary to place fixed projections on the body, between which the free rear end of the shaft might oscillate, but against which the shaft would stop when the body was tipped backward or forward by the weight of the occupant, so that such a vehicle having the said fixed projections and the spring relatively adjusted to the weight of one occupant was uncomfortable for two occupants, by reason of the projections on the body coming in contact with the free end of the shaft.

In my device the relative arrangement of the spring, its connection with the body, and the point on which the shaft oscillates are such that the device is easily and cheaply constructed and applied, and the tendency of the body to tip forward or backward, whether having one occupant or more, is fully counteracted by the spring, so that no stops are necessary.

I claim as my invention—

In combination with a two-wheeled vehicle mounted on suitable riding-springs, and a pair of shafts for drawing the same, a pair of flat springs, A, each having the short curve $r$, and eyes $b$ and $c$, attached to the under sides of said shafts, and a pair of brackets, $h$, secured to the vehicle-body forward of the axle and to the springs near the curve $r$, all arranged in the manner and for the purpose specified.

ADAM HOFMANN.

Witnesses:
   H. P. HOOD,
   V. M. HOOD.